United States Patent
Glancy et al.

(10) Patent No.: US 8,308,889 B2
(45) Date of Patent: Nov. 13, 2012

(54) OUT-OF-AUTOCLAVE AND ALTERNATIVE OVEN CURING USING A SELF HEATING TOOL

(75) Inventors: George J. Glancy, North Ogden, UT (US); David L. Johnson, Roy, UT (US)

(73) Assignee: Alliant Techsystems Inc., Minneapolis, MN (US)

( * ) Notice: Subject to any disclaimer, the term of this patent is extended or adjusted under 35 U.S.C. 154(b) by 99 days.

(21) Appl. No.: 12/870,556

(22) Filed: Aug. 27, 2010

(65) Prior Publication Data

US 2012/0048472 A1 Mar. 1, 2012

(51) Int. Cl.
*B32B 27/00* (2006.01)
*B32B 37/06* (2006.01)
*B28B 7/42* (2006.01)
(52) U.S. Cl. ............... 156/242; 156/245; 156/379.6; 156/380.6; 249/78; 264/219; 264/402; 264/404
(58) Field of Classification Search .............. 249/78; 264/402, 403, 404; 156/379.6, 379.7, 380.2, 156/380.3, 380.5, 380.6, 380.8, 380.9
See application file for complete search history.

(56) References Cited

U.S. PATENT DOCUMENTS

| | | | | |
|---|---|---|---|---|
| 5,989,008 | A * | 11/1999 | Wytkin | 425/432 |
| 6,861,021 | B2 * | 3/2005 | Montgomery et al. | 264/69 |
| 7,919,037 | B1 * | 4/2011 | Boyce | 264/404 |
| 2009/0194525 | A1 | 8/2009 | Lee et al. | |
| 2010/0062099 | A1 | 3/2010 | Funke et al. | |
| 2010/0140448 | A1 | 6/2010 | Koerwien | |
| 2011/0254189 | A1 * | 10/2011 | Doyle et al. | 264/101 |

FOREIGN PATENT DOCUMENTS

| | | | |
|---|---|---|---|
| DE | 10 2004 042 422 A1 | 3/2006 | |
| DE | 10 2006 058198 A1 | 6/2008 | |
| JP | 02088204 A | * | 3/1990 |
| JP | 05318488 A | * | 12/1993 |
| JP | 2008-198407 | | 8/2008 |
| WO | WO 0054949 A2 | * | 9/2000 |

OTHER PUBLICATIONS

Peters, S.T., Handbook of Composites, Second Edition, Chapman & Hall, 1998, pp. 32-33.*
Machine translation of German Patent Application Publication No. DE 2004042422A1, 2004, 3 pages.*
European Search Report for EP 11 17 7982.3 mailed Nov. 23, 2011, 8 pages.
Boyce Components Introduces Electrically Conductive Resin. Aug. 14, 2006. [online]. [retrieved on Nov. 11, 2010]. Retrieved from the Internet: <http://www.netcomposites.com/sitesearch.asp>.
Boyce Components LLC. "Spray on Composites Heating System From Boyce Components" [online]. [retrieved on Nov. 11, 2010]. Retrieved from the Internet: <http://www.azom.com/New.asp?NewsID=6302>.
LeGault, Michael. "Tooling Update: New dimensions in tooling," High Performance Composites [online]. Jan. 1, 2008. [retrieved on Nov. 12, 2010]. Retrieved from the Internet: <http://www.compositesworld.com/articles/tooling-update-new-dimensions-in-tooling>.

* cited by examiner

*Primary Examiner* — William Bell
(74) *Attorney, Agent, or Firm* — IPLM Group, P.A.

(57) ABSTRACT

Method and apparatus for curing composite material to form composite structures are provided. A curing tool in one embodiment includes cured nano tube impregnated resin, at least two conductors formed in the nano tube impregnated resin, at least one layer of cured composite material and at least one insulation layer separating the cured composite material from the nano tube impregnated resin.

11 Claims, 17 Drawing Sheets

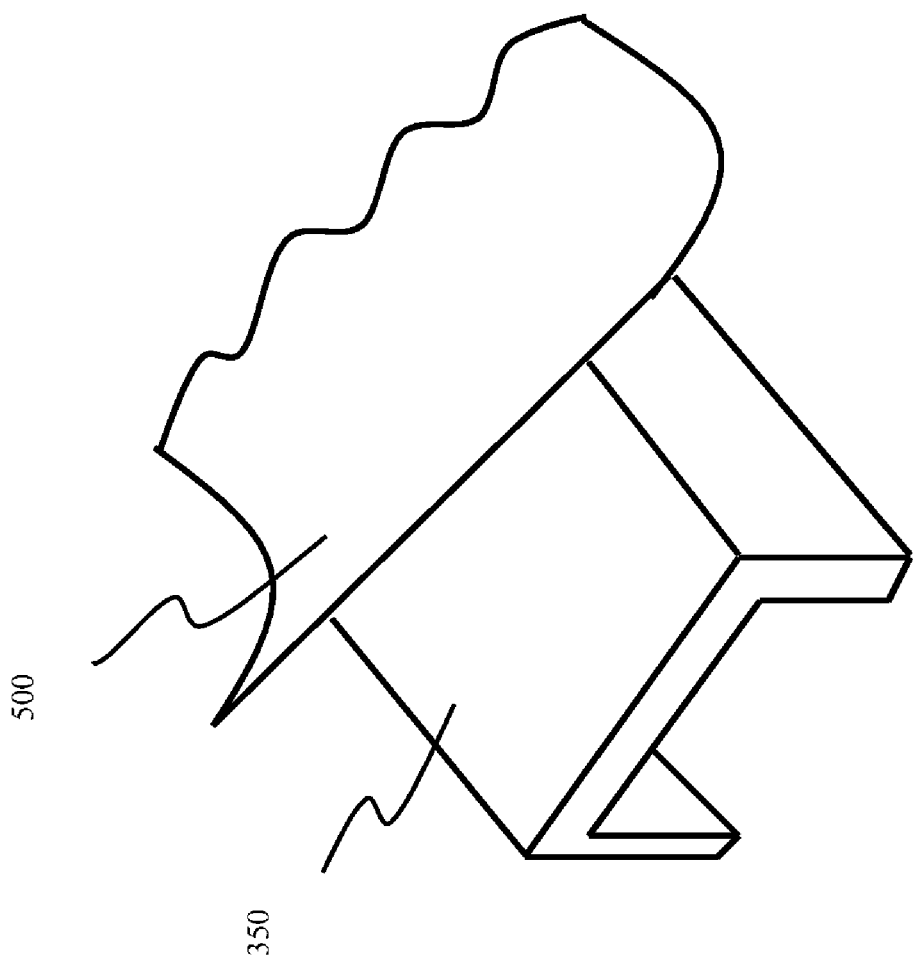

US 8,308,889 B2

OUT-OF-AUTOCLAVE AND ALTERNATIVE OVEN CURING USING A SELF HEATING TOOL

STATEMENT REGARDING FEDERALLY SPONSORED RESEARCH OR DEVELOPMENT

The United States Government may have certain rights to this application under contract No. FA9453-06-D0368-0003.

BACKGROUND

Composite structures formed from pre-impregnated (pre-preg) material are used in the formation of high strength-low weight structures such as, but not limited to, parts used to build aircraft and spacecraft. Pre-preg material is made of composite fibers such as carbon, glass, aramid and the like, that are bonded together with a resin that is activated with heat to cure. The pre-preg material is typically supplied in sheets or plies. The manufacturer then forms stacks of plies of pre-preg material on a forming surface of a tool having a desired shape. Once the pre-preg material is formed on the tool, the tool is placed in an autoclave or conventional oven to cure the resin. The aerospace industry's desire for increasingly larger structures has resulted in larger autoclaves and conventional ovens needed to cure the pre-preg material. The larger the autoclaves and conventional ovens, the more costs associated with building and operating them.

For the reasons stated above and for other reasons stated below which will become apparent to those skilled in the art upon reading and understanding the present specification, there is a need in the art for an effective and efficient method of forming composite structures without the use of an autoclave or conventional oven.

SUMMARY OF INVENTION

The above-mentioned problems of current systems are addressed by embodiments of the present invention and will be understood by reading and studying the following specification. Embodiments of the present invention include both apparatuses and methods. The following summary is made by way of example and not by way of limitation. It is merely provided to aid the reader in understanding some of the aspects of the invention.

In one embodiment, a method of curing composite material to form a composite structure is provided. The method includes, laying up pre-preg material on a composite structure forming tool and heating the tool internally to cure the pre-preg material.

In another embodiment, a curing tool is provided. The curing tool includes cured nano tube impregnated resin, at least two conductors formed in the nano tube impregnated resin, at least one layer of cured composite material and at least one insulation layer separating the cured composite material from the nano tube impregnated resin.

In yet another embodiment, a method of forming a self heating tool is provided, the method includes forming at least one insulation layer. Applying at least a first coating of nano tube impregnated resin on a first layer of the at least one insulation layer. Selectively placing at least two conductive strips on the first coat of nano tube impregnated resin. Applying at least a second coating of nano tube impregnated resin over the at least two conductive strips and first coating of nano tube impregnated resin. Curing at least the first and second coatings of nano tube impregnated resin. Forming passages to the at least two conductive strips through a portion of the cured nano tube impregnated resin and coupling conductive wires to the at least two conductive strips through the passages.

BRIEF DESCRIPTION OF THE DRAWINGS

The present invention can be more easily understood and further advantages and uses thereof will be more readily apparent, when considered in view of the detailed description and the following figures in which:

FIGS. 5A and 5B are partial side perspective views in forming a composite structure on a self heated tool of one embodiment of the present invention.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the invention may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide methods and apparatuses for fabricating molds, forms, or mandrels (that can be generally referred to as a tool) that are self heating. Hence, in embodiments, a tool is provided that includes an internal heating source. Embodiments allow composite structures to be cured on the same tool as they were fabricated on without the need for an autoclave or an oven. Hence, large out-of-autoclave structures are cured while sitting on a production floor thereby eliminating size constraints on autoclaves and ovens. Also, embodiments of the self heating tools allow for the mass production of smaller composite parts. Rather than stacking hundreds of uncured parts into an autoclave in a time-consuming process, each part could have its own self heating tool. Each self heating tool can be heated on the production floor thereby providing an efficient part flow through the manufacturing plant.

In embodiments, a tool is formed with resin impregnated with nano tubes. The nano tubes in embodiments are electrically conductive. In one embodiment the nano tubes used to impregnate the resin are carbon nanofibers (nano tubes). Passing current through the resin results in heat being generated due to electrical resistance in the nano tube impregnated resin. In embodiments, by varying the electrical power, the amount of heat created by the tool is varied. Moreover, in embodiments, conductive strips, such as, but not limited to, copper strips are embedded in the cured nano tube impregnated resin. An electrical potential is created between adjacent conductive strips (conductive strips that are near each other) which cause a current to pass through the nano tube impregnated resin. In an embodiment, an alternating current (AC) is applied to the adjacent conductive strips to produce the current through the nano tube impregnated resin.

Figure 1:
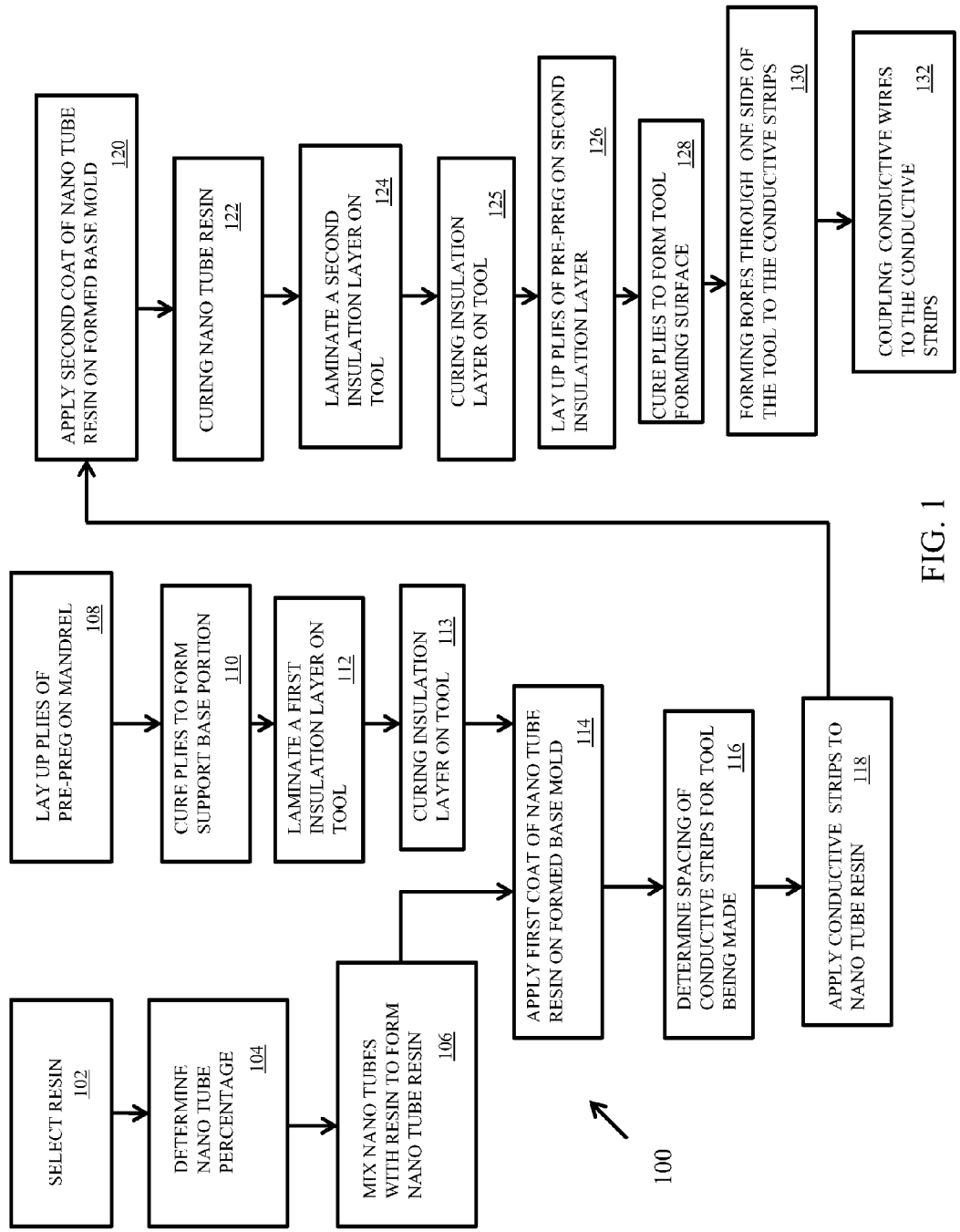
FIG. 1 is a tool formation flow diagram of one embodiment of the present invention.

Referring to FIG. 1, a formation flow diagram 100 of one embodiment is illustrated. The formation flow diagram 100 is described below in concert with illustrations in FIGS. 2 through 3I. In forming a tool, a first step is determining what resin is compatible with a heat range needed to cure pre-preg material (out of autoclave material) used to form a composite structure (102). Then it is determined what the nano tube percentage should be in relation to the resin (104). The percentage ratio is based on a desired outcome (desired heat to be generated by a tool). The nano tubes are then mixed with the resin to form carbon nano tube impregnated resin (106). A type of resin that can be used is K-factor resin provided by Boyce Components LLC. Example nano tubes used are carbon nano tubes provided by Polygraf Products which is a part of Applied Sciences Inc.

Figure 3A:
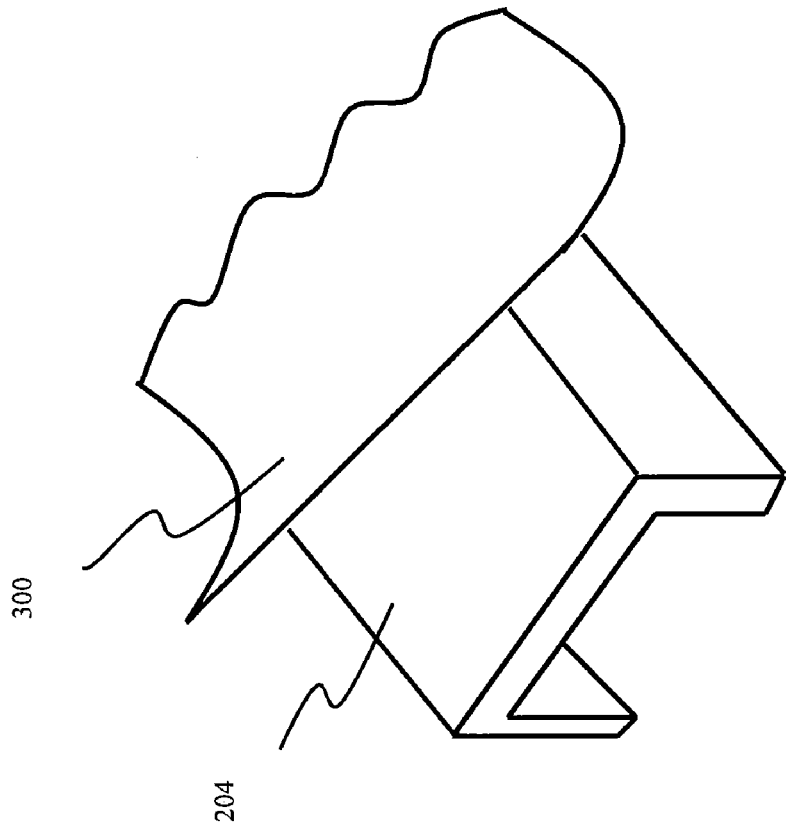
FIGS. 3A-3I are partial side perspective views illustrating the further formation of a heating tool of one embodiment of the present invention.
Figure 2:
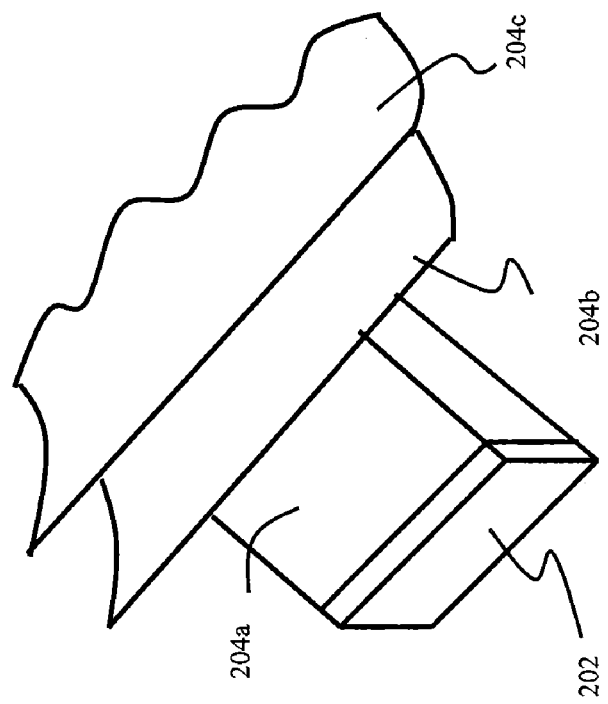
FIG. 2 is a partial side perspective view illustration of the formation of a support base portion of a tool of one embodiment of the present invention.

A foundation for the nano tube impregnated resin has to be provided to form the self heating tool. In one embodiment, plies of pre-preg material 204a, 204b, 204c are laid up and formed on a mandrel 202 (108). The plies of pre-preg material form a support base portion 204. In one embodiment six to eight layers (plies) of carbon pre-preg material are used to form the support base portion 204 which is approximately 0.180 to 0.250 inches thick. FIG. 2 illustrates ply layers 204a, 204b and 204c being applied to the mandrel 202. In one embodiment, the ply layers of pre-preg material 204a, 204b and 204c include carbon fibers. The plies that make up the support base portion 204 are then cured (110). After the support base portion 204 is cured, a first insulation layer 300 is applied (112). This is illustrated in FIG. 3A. In one embodiment, the first insulation layer 300 is a dry woven glass layer 300 that is laminated on the support base portion 204. The insulation layer (dry woven glass layer 300) is then cured on the support base portion 204 (113). The thickness of the insulation layer 300 in one embodiment is in the range of 0.003 to 0.005 inches.

Figure 3C:
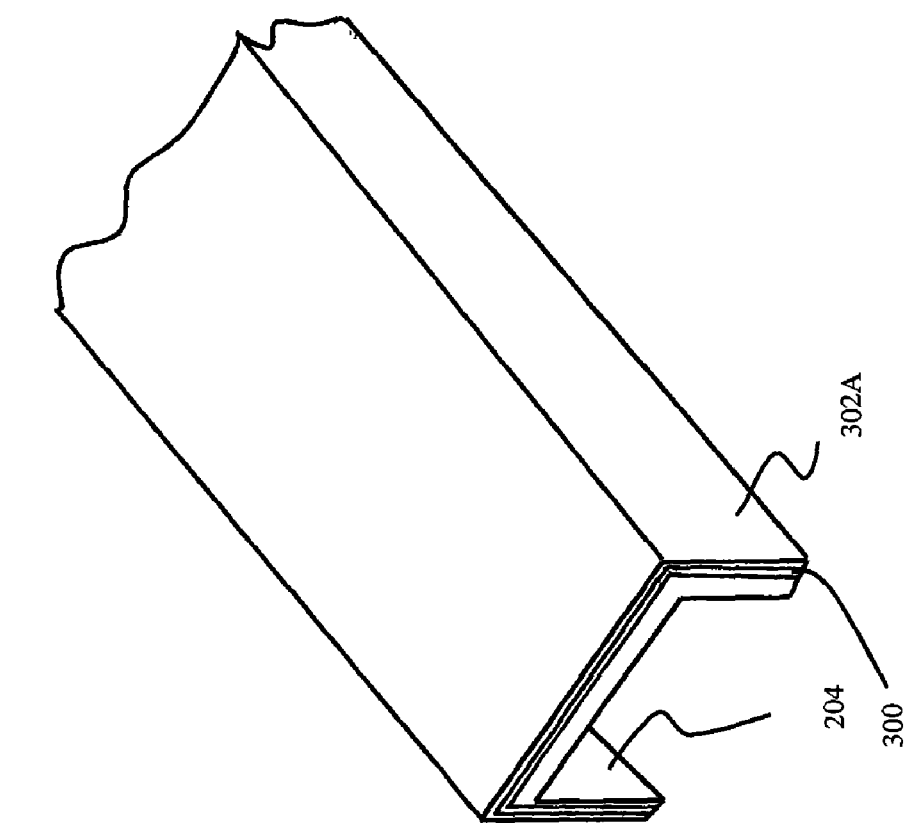
Figure 3B:
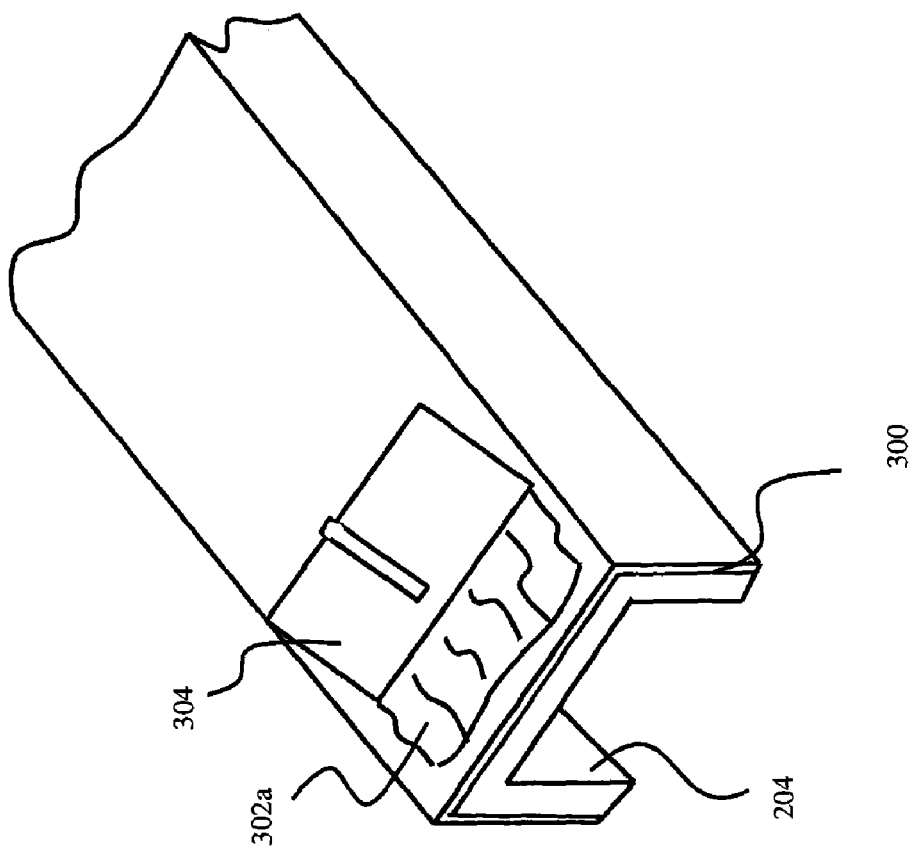
Figure 3E:
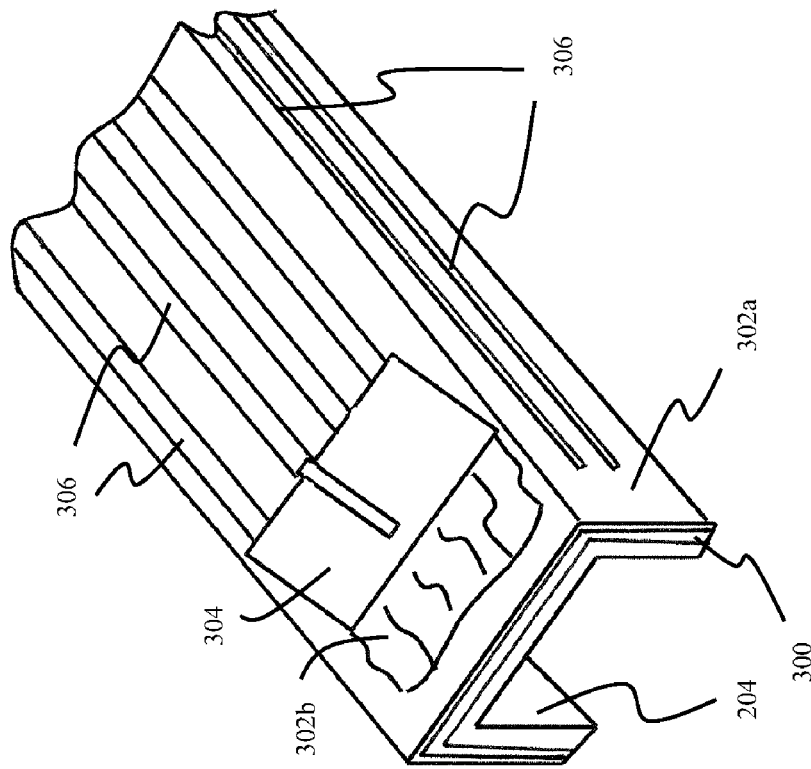
Figure 3D:
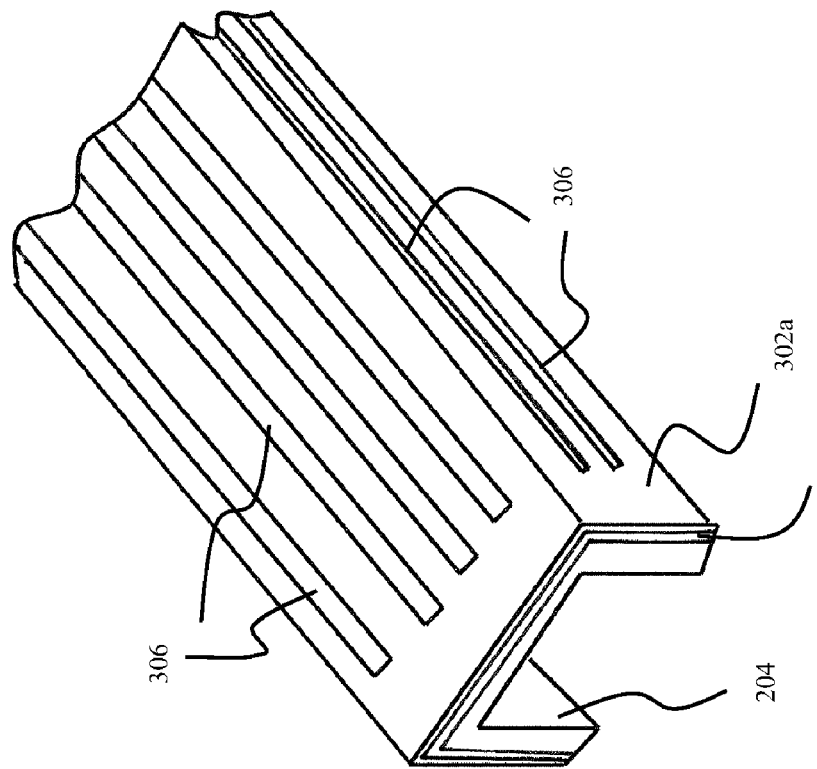
Figure 3F:
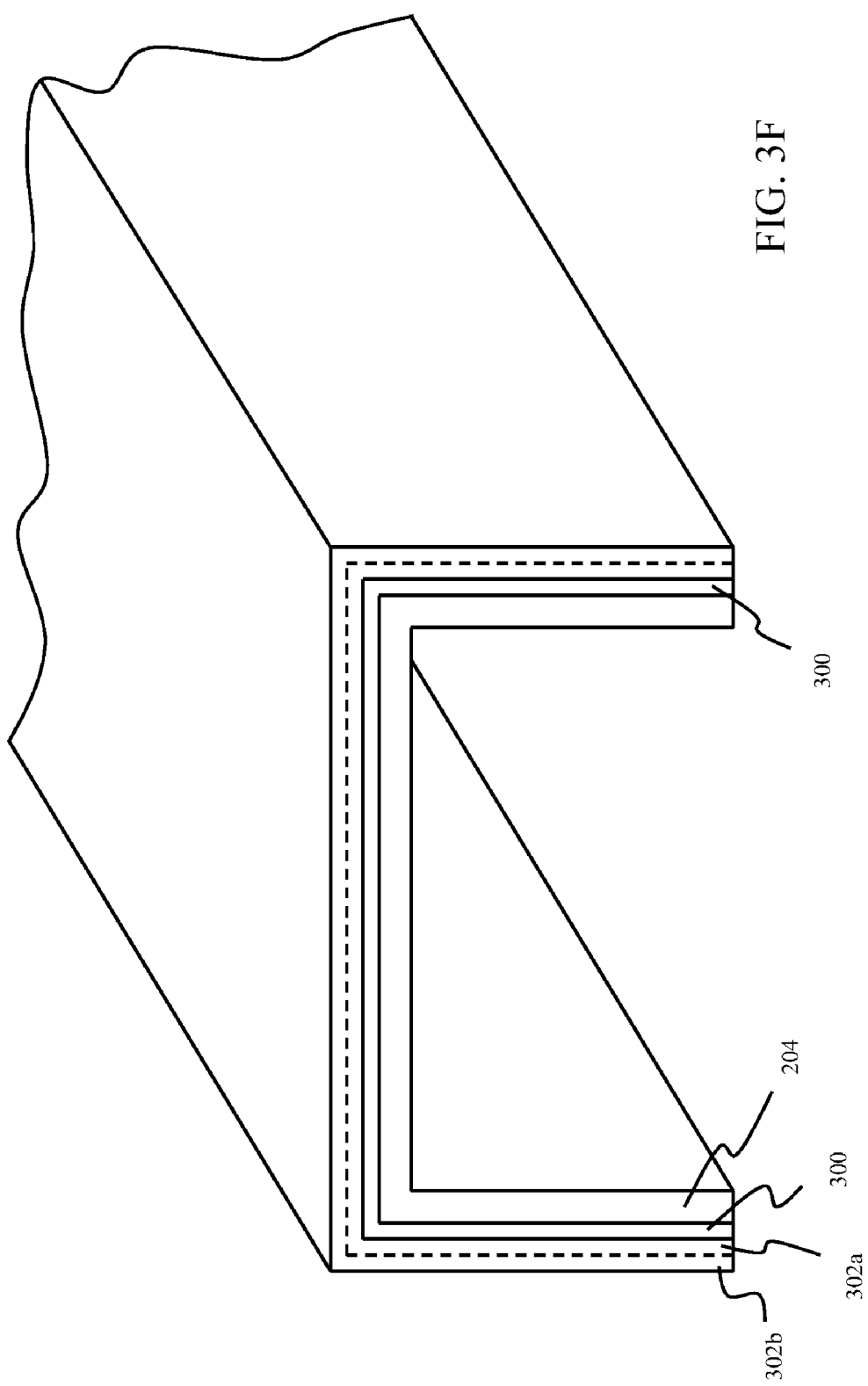

Once the first dry woven glass layer 300 has been cured, a first coat of carbon nanotube impregnated resin 302a is applied over the dry woven glass layer 300 (114). This is illustrated in FIGS. 3B and 3C. In one embodiment, a sponge brush 304 is used to apply the first coat of carbon nano tube impregnated resin 302a to the first dry woven glass layer 300. In one embodiment, the first coat of carbon nano tube impregnated resin 302a is applied with a uniform thickness of approximately 10 to 11 mils. The desired spacing of the conductive strips 306 to be used in the tool is then determined (116). In one embodiment, the conductive strips 306 (conductors) are made of a metal such as copper. The conductive strips 306 are then placed on a surface of the first coat carbon nano tube impregnated resin 302a (118) as illustrated in FIG. 3D. A second coat of carbon nano tube impregnated resin 302b is then applied over the first coat of carbon nano tube impregnated resin 302a and the conductive strips 306 (120). The first and second coats of carbon nano tube impregnated resin 302a and 302b are then cured (122). The tool in this state is illustrated in FIG. 3F. Although, the conductive strips 306 are illustrated above as being substantially straight in the embodiment illustrated in FIGS. 3D and 3E, in other embodiments, the conductive strips 306a can take any shape as needed to distribute the heat in the tool 350 as desired. For example, in FIG. 3M the conductive strips 306a and 306b are patterned to achieve a desired heating distribution.

Figure 3G:
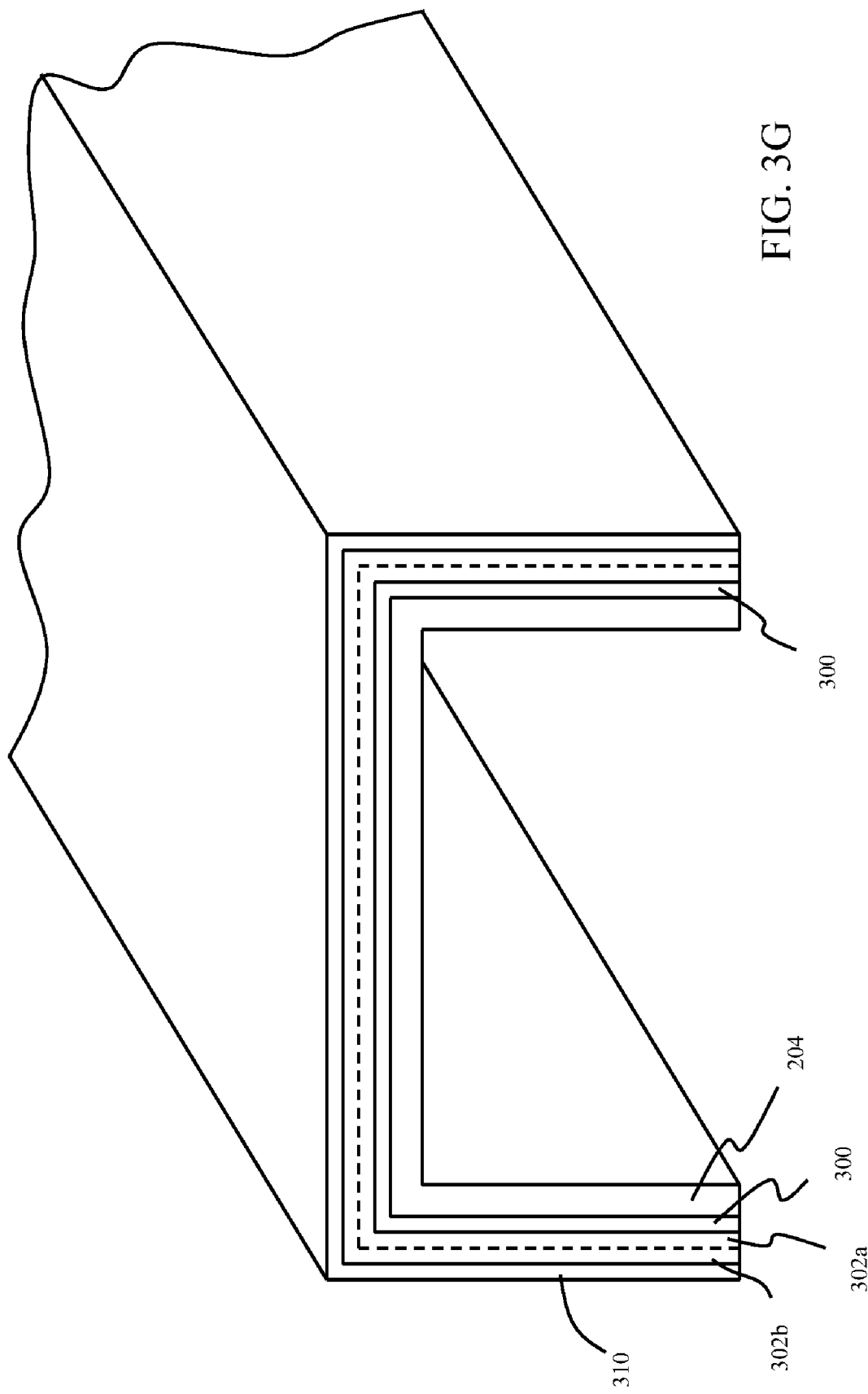
Figure 3H:
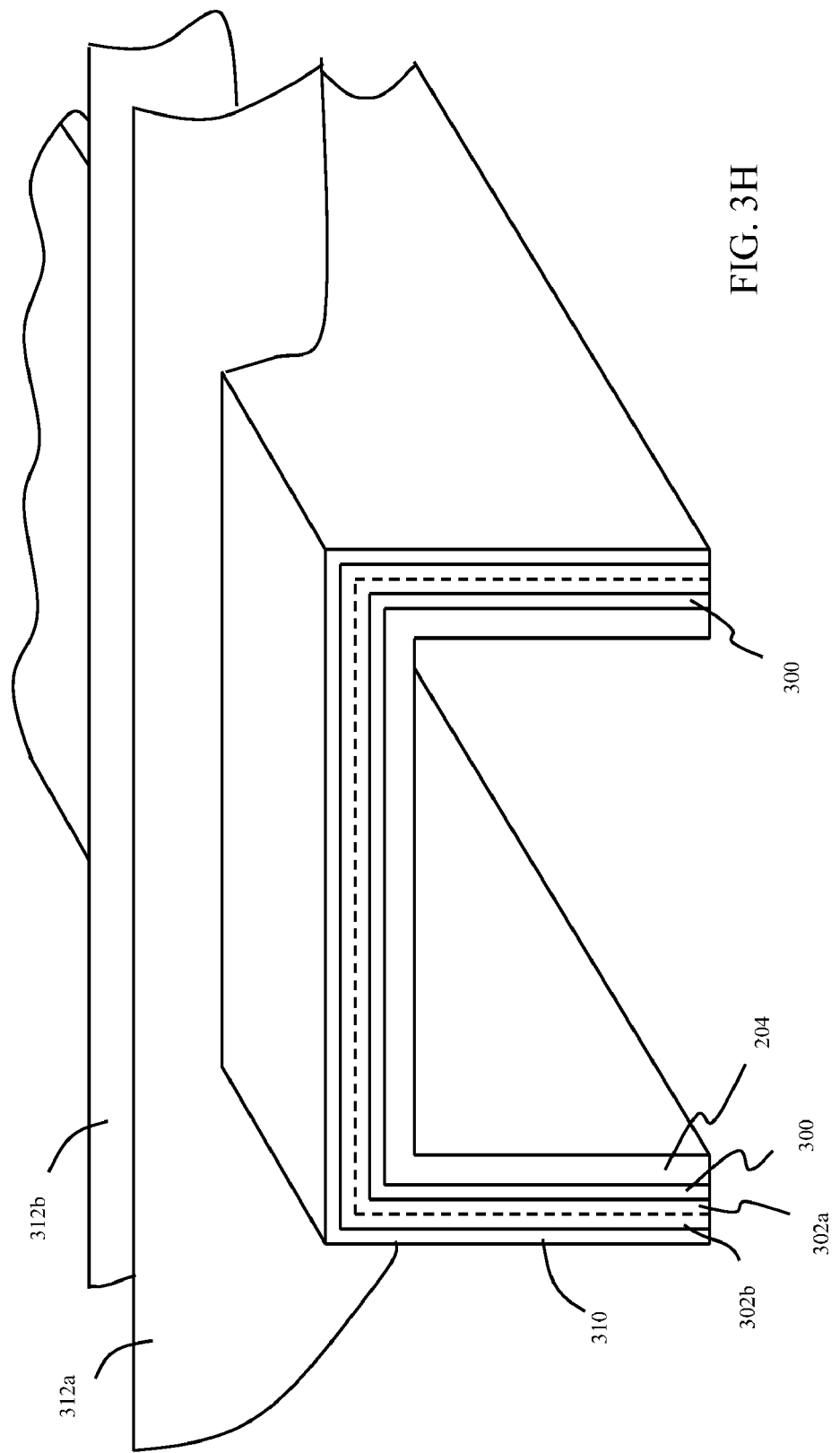
Figure 3I:
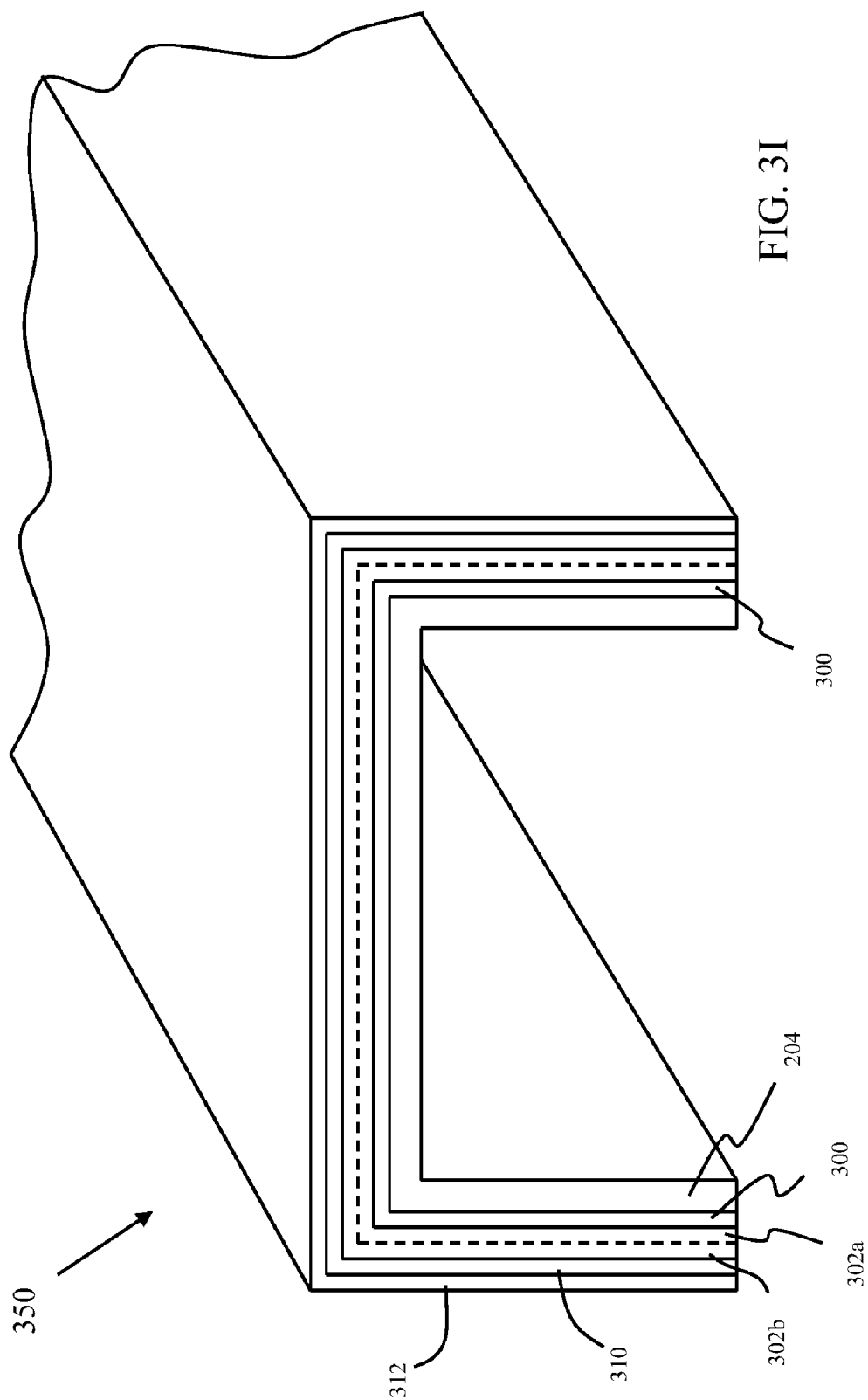

A second insulation layer 310 is laminated then laid up and laminated on the carbon nano tube impregnated resin 302b (124). This layer of the insulation 310 is then cured (125). In one embodiment, the second insulation layer 310 is a dry woven glass layer 310 having a thickness in the range of 0.003 to 0.005 inches. The addition of the second insulation layer 310 is illustrated in FIG. 3G. Once the second insulation layer 310 has been formed, ply layers 312a and 312b of pre-preg material are laid up (126) and cured (126) to form a tool forming surface 312 of the tool 350. The lying up of the ply layers 312a and 312b are illustrated in FIG. 3H and the formed tool forming surface 312 is illustrated in FIG. 3I. FIG. 3I also illustrates the layers of a formed tool 350 in an embodiment. In one embodiment, the ply layers of pre-preg material 312a and 312b include carbon fibers. Moreover, the number of ply layers 312a and 312b used to form the tool forming surface portion 312 can vary depending on a desired outcome. In one embodiment, the thickness of the tool forming surface 312 is in a range of 0.035 to 0.040 inches. Although, the formed tool 350 illustrated in FIG. 3I is generally C-shaped, the tool can have any desired cross-sectional shape desired depending on the application. Moreover, the tool can be straight along its length, it can be curved along its length and its cross-sectional geometry can vary along its length. Hence, any shaped tool is contemplated and tool 350 of FIG. 3I is merely an example of one shape of a tool used to form a C-shaped composite structure.

Figure 3J:
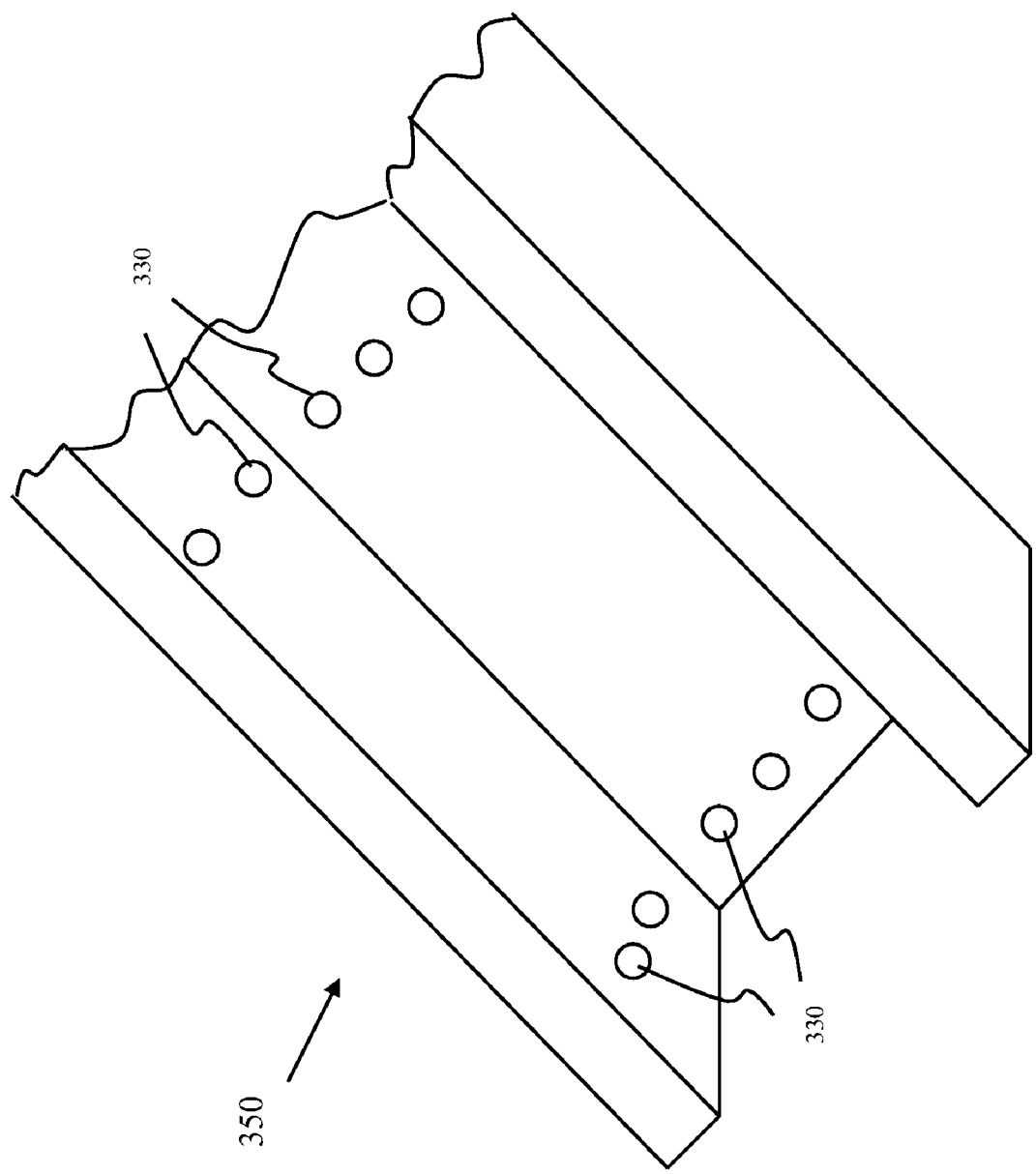
FIG. 3J is a bottom perspective view of the tool with formed passages of one embodiment of the present invention.
Figure 3K:
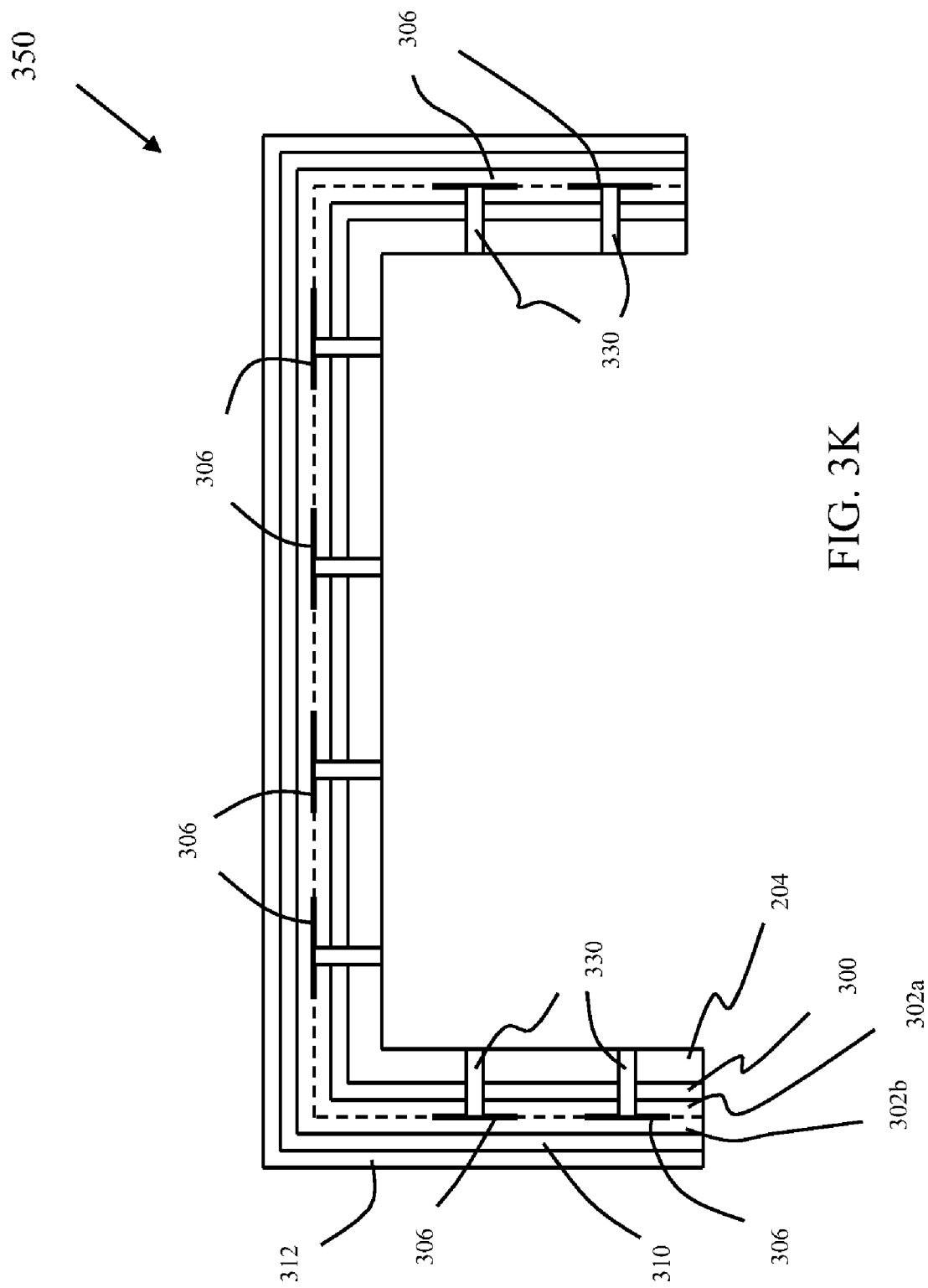
FIG. 3K is a cross-sectional end view of a heating tool of one embodiment of the present invention.
Figure 3L:
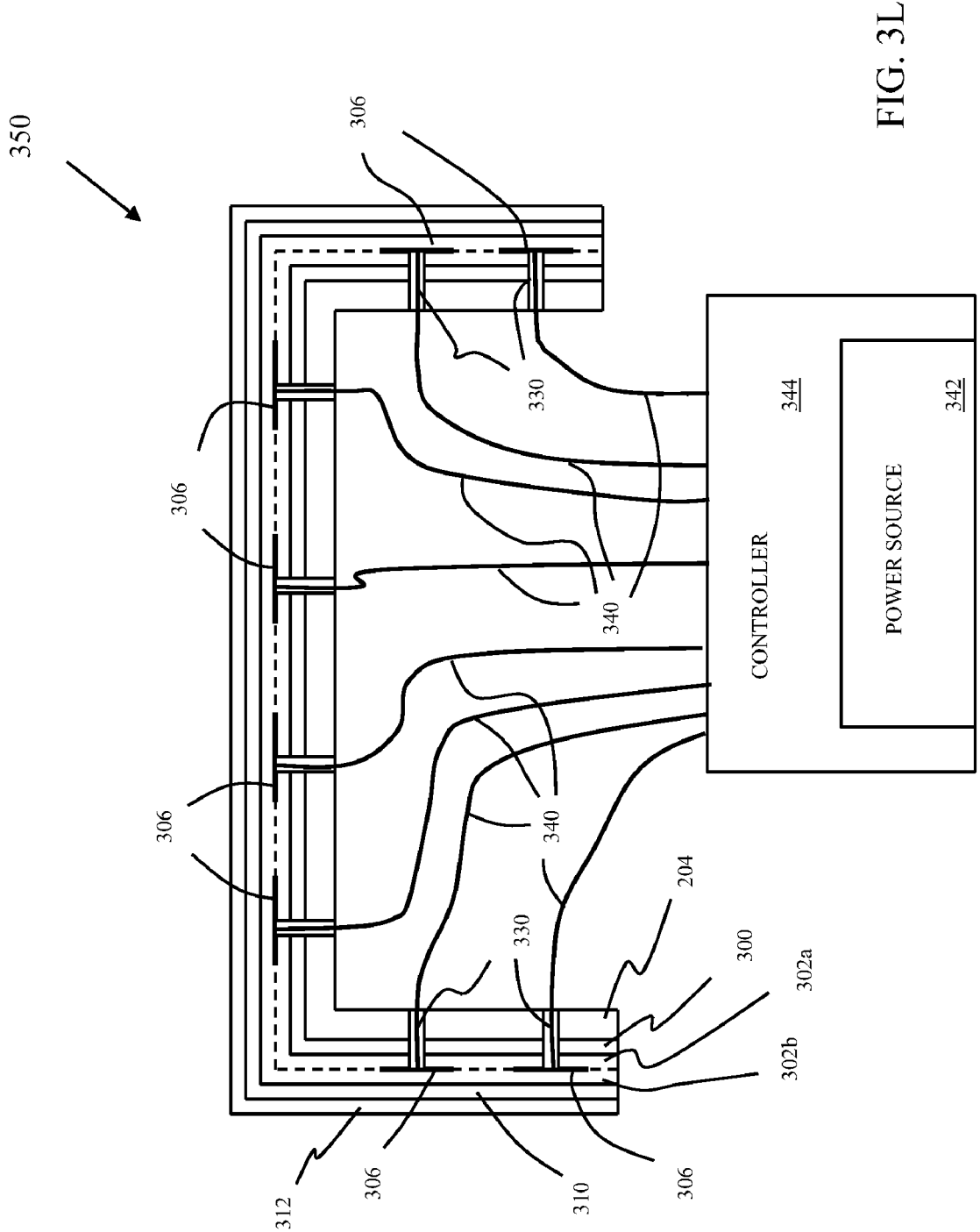
FIG. 3L is a cross section end view of the heating tool of FIG. 3H coupled to a controller and power source of one embodiment of the present invention.
Figure 3M:
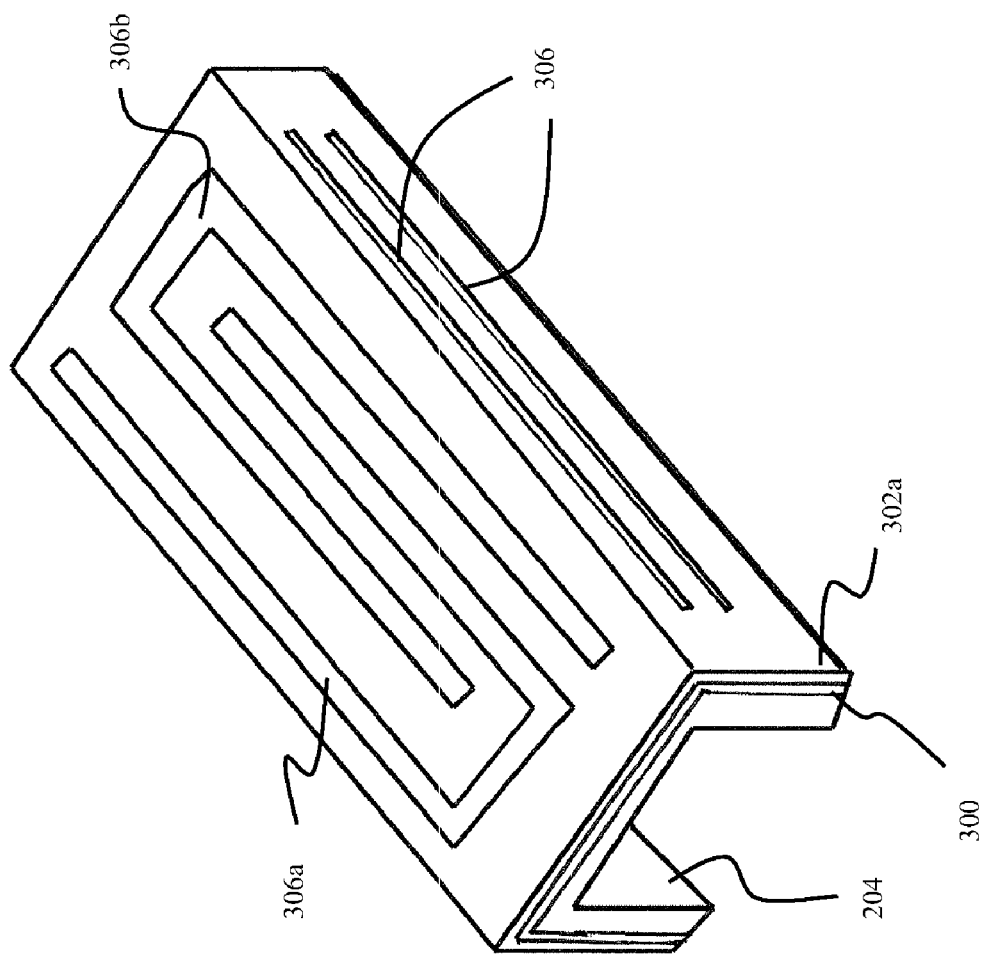
FIG. 3M is a side perspective view of the forming of conductors in a heating tool of another embodiment of the present invention.

In one embodiment, the tool 350 is removed from the base mold 124 once the tool is formed. Bores 330 are then selectively formed through the base support portion 204, the first insulation layer 300 and the first cured carbon nano tube impregnated resin 302a to the conducting strips 306 (130). This is illustrated in FIG. 3J and FIG. 3K. In one embodiment, a Dremel® power tool by the Robert Bosch Tool Corporation, or similar tool, is used to make the bores through the tool 350 to the respective conducting strips 306. Conductive wires 340 are then coupled to the conductive strips 306 (132) as illustrated in FIG. 3L. FIG. 3L further illustrates, a power source 342 coupled to the conductive wires 340 and a controller 344. The controller 344 is designed to control the power source 342. As stated above, in one embodiment, the power source 342 provides an alternating current (AC) to respective conductive strips 306 to heat up the tool 350. As illustrated in FIG. 3L, the first and second insulation layers 300 and 310 insulate the conductors 306 and nano tube impregnated resin 302a from the material that makes up the support base portion 204 and the tool forming surface portion 312. This prevents the support base portion 204 and the tool forming surface portion 312 from passing current out of the tool 350. This would be an issue in an embodiment where the support base portion 204 and the tool forming surface 312 include conductive material such as carbon fibers. The insulation layers 300 and 310 also help prevent the nano tube impregnated resin from spreading onto the composite material of the support base portion 204 and the tool forming surface portion 312 during formation of the tool.

Figure 4:
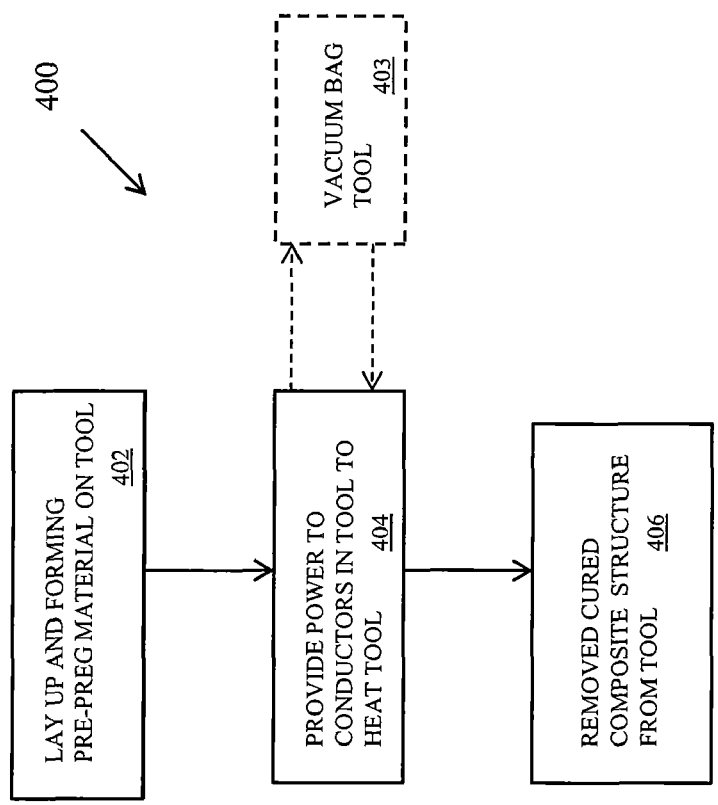
FIG. 4 is a composite structure forming flow diagram of one embodiment of the present invention.
Figure 5B:
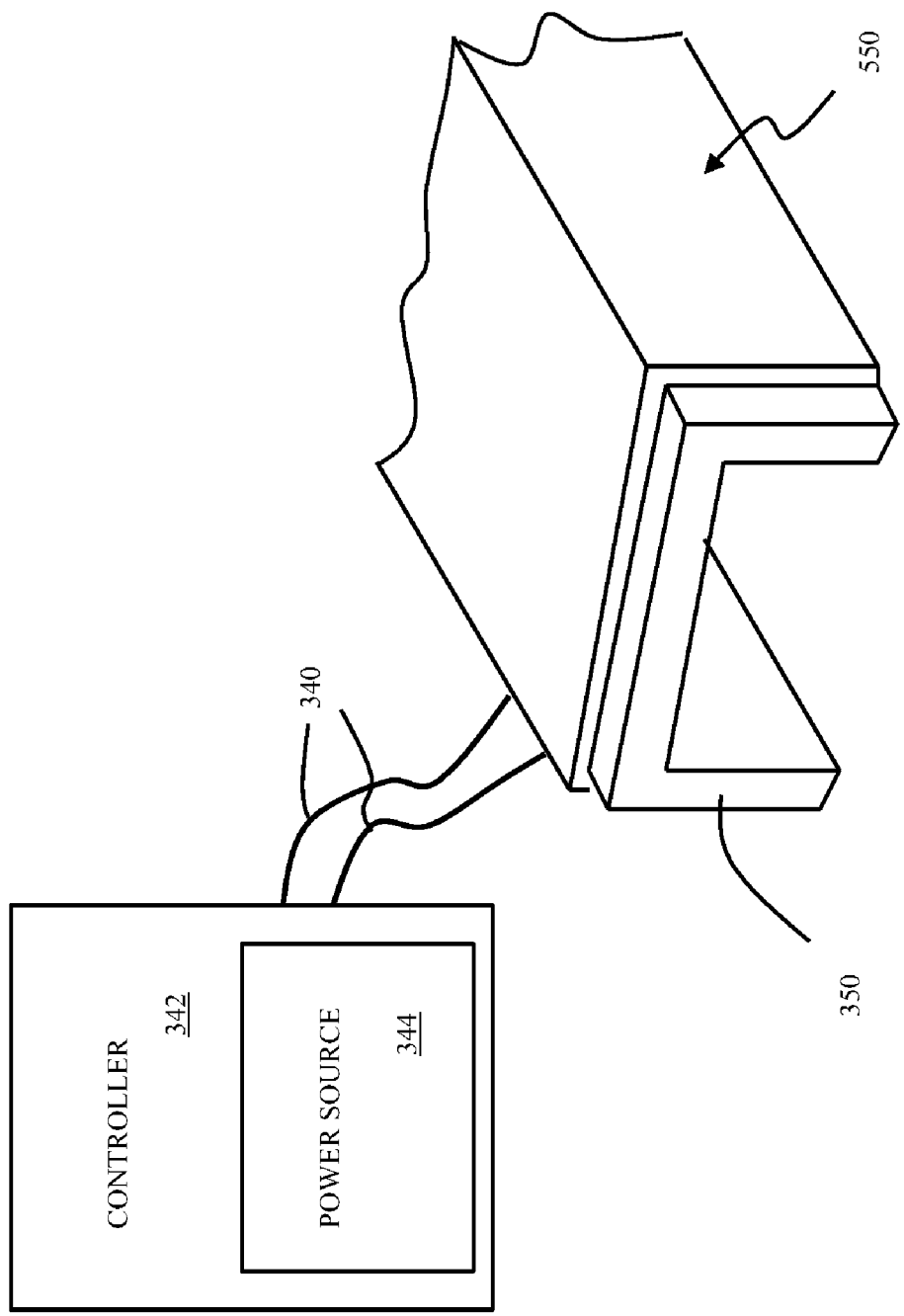

Referring to FIG. 4, an illustration of a composite structure forming flow diagram 400 is illustrated. The flow diagram 400 is described in concert with FIGS. 5A and 5B. The process starts by laying up and forming pre-preg material on the tool (402). In one embodiment, this is done by applying one or more layers of pre-preg material on the tool forming surface portion 312 of the tool 350 and pressing the one or more layers of pre-preg material onto the tool forming surface portion 312 of the tool 350 to form the pre-preg material into the shape of the tool forming surface portion 312. An example of laying up a layer of ply material 500 on a tool 350 is illustrated in FIG. 5A. Any method known in the art to lay up and form the pre-preg material 500 on the tool 350 can be used. An example method of laying up and forming pre-preg material on a tool is illustrated in commonly assigned U.S. Pat. No. 7,249,943 entitled "Apparatus for Forming Composite Stiffeners and Reinforced Structures" that issued on Jul. 31, 2007 and U.S. Pat. No. 7,513,769 entitled "Apparatus and Methods for Forming Composite Stiffeners and Reinforcing Structures" that issued on Apr. 7, 2009 both of which are incorporated herein by reference. Moreover, any other method of laying up and forming the pre-preg material on a tool can be used, such as hot drape forming and other methods known in the art. Once the pre-preg material is positioned on the tool, the power source 342 provides power to the conductive strips 306 in the tool 350 (404). An example, of the power source 342 coupled to heat a tool 350 is illustrated in FIG. 5B. In FIG. 5B pre-preg material on the tool 350 is cured to form a composite structure 550. In particular, the heat of the tool 350, as a result of the power being supplied to conductors (conductive strips) in the tool 350, cures the pre-preg material (404) to form the composite structure 550. In one embodiment, a vacuum bag system known in the art is used to compact the pre-preg material during curing (403). Once the pre-preg material is cured, the formed composite structure 550 is removed from the tool 350 (406).

Figure 6:
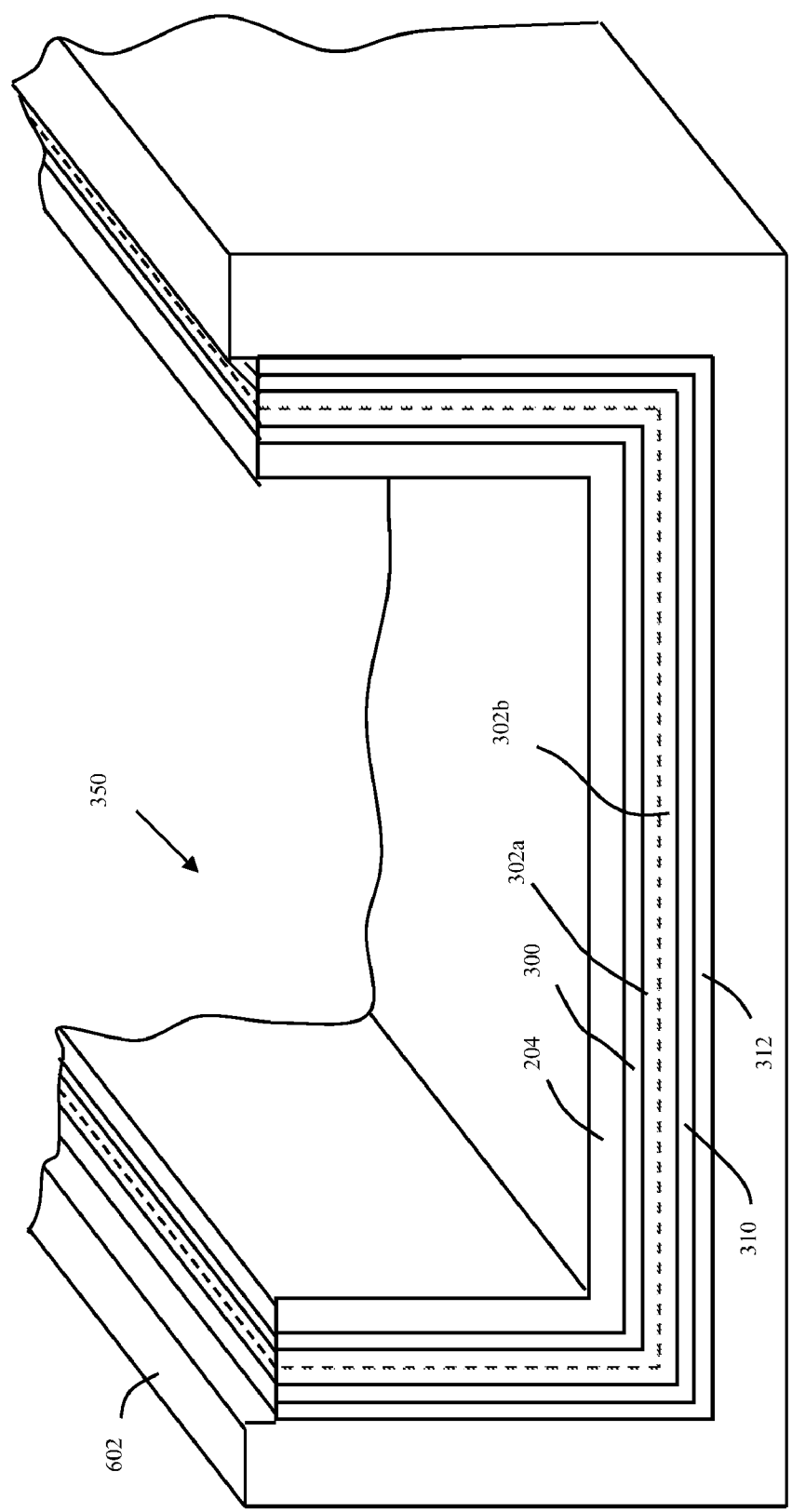
FIG. 6 is a side perspective view of a lay up of the heating tool of another embodiment.

Referring to FIG. 6, a lay up (formation) of the tool 350 of another embodiment is illustrated. In this embodiment the tool is formed on a master 602 (mandrel) in an opposite manner as the embodiment discussed above. In this embodiment, the master 602 is generally in the shape of the part to be made on the heated tool 305. Hence, the formation of the tool on a mandrel can be made in different ways. One advantage to the formation of the tool 350 as illustrated in FIG. 6 is that the tool forming surface portion 312 will be relatively smooth and provide a good surface to form the composite structures. Conversely, a surface of the support base portion 102 will be rougher due to the use of one or more vacuum bags used to cure the tool 350.

Figure 7:
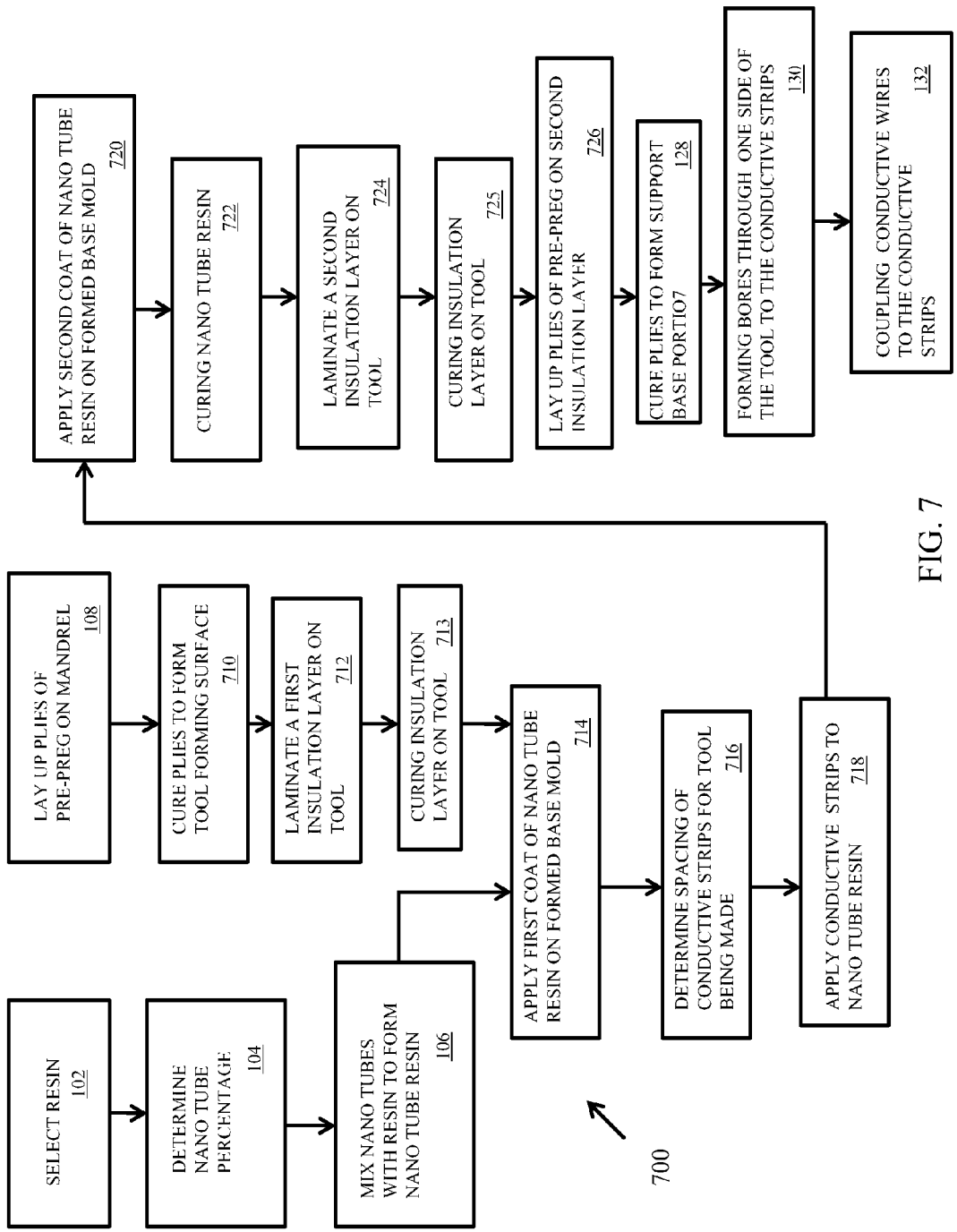
FIG. 7 is a tool formation flow diagram of the formation of the tool of FIG. 6.

FIG. 7 illustrated a tool formation flow diagram 700 pursuant to the lay up illustrated in FIG. 6. The flow diagram 700 starts similar to the flow diagram 100 described above. The resin is selected (102). The nano tube percentage is selected (104). The nano tubes and resin are mixed to form the nano tube impregnated resin 302 (106). Plies of pre-preg material are layed up on the master (708). The plies are then cured (710) to form the tool forming surface portion 312 on a surface of the master 702. A first insulation layer 300 is then laminated on a back side of the tool forming surface portion 312 (712). The first insulation layer 300 is then cured (713). A first coat of nano tube resin 302*a* is then applied to the cured first insulation layer 300 (714). It is then determined what the spacing should be for the conductive strips (716). The conductive strips 306 are then placed on the first coat of nano tube resin 302*a* (718). A second coat of nano tube resin 302*b* is then applied covering the conductive strips 306 (720). The nano tube resin 302*a* and 320*b* is then cured (722). A second layer of insulation 310 is then laminated over the nano tube resin 302*a* and 320*b* (724). The insulation layer 310 is then cured (725). Plies of pre-preg material are then layed up on the second layer of insulation 310 (726). The plies of pre-preg material are then cured to form the support base portion (128). Bores are then formed through the support base portion 204 to the conductive strips (130) as described above in regards to FIG. 3J. Conductive wires are then coupled to the conductive strips (132). As understood in the art, curing of the various materials to make the tool 350 may include various forms of vacuum bagging techniques.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of forming a self heating tool, the method comprising:
   laying up a plurality of plies of pre-preg material including carbon fibers on a mandrel;
   curing the plurality of plies to form a forming surface of the self heating tool adjacent the mandrel;
   forming at least one insulation layer on the cured plurality of plies;
   applying at least a first coating of nano tube impregnated resin on a first layer of the at least one insulation layer;
   selectively placing at least two conductive strips on the first coat of nano tube impregnated resin;
   applying at least a second coating of nano tube impregnated resin over the at least two conductive strips and first coating of nano tube impregnated resin;
   curing at least the first and second coatings of nano tube impregnated resin;
   forming passages to the at least two conductive strips through a portion of the cured nano tube impregnated resin; and
   coupling conductive wires to the at least two conductive strips through the passages.

2. The method of claim 1, wherein the at least one insulation layer is a dry woven glass layer.

3. The method of claim 2, wherein forming the dry woven glass layer further comprises:
   laminating the dry woven glass layer.

4. The method of claim 3, further comprising:
   curing the dry woven glass layer before the first and second coating of the nano tube impregnated resin is applied.

5. The method of claim 1, wherein the nano tube impregnated resin includes carbon nano tubes impregnated in resin.

6. The method of claim 5, further comprising:
   selecting resin that is compatible for a given heat range used to cure composite material.

7. The method of claim 5, further comprising:
   determining nano tube and resin percentage.

8. The method of claim 1, further comprising:
   forming a support base portion, the first layer of the at least one insulation layer being formed on the support base portion; and forming a tool forming surface portion, the at least two conductive strips positioned between the support base portion and the tool forming surface.

9. The method of claim 8, wherein forming the at least one layer of insulation further comprises:

forming a second layer of the at least one insulation layer between the tool forming surface portion and the at least two conductive strips.

10. A method of forming a self heating tool, the method comprising:

forming a tool forming surface portion with a plurality of plies of pre-preg material including carbon fibers on a master mandrel;

forming a first insulation layer on the tool forming surface portion;

applying a first coat of nano tube resin on the formed first insulation layer;

selectively placing conductive strips on the first coat of nano tube resin;

applying a second coat of nano tube resin on conductive strips and first coat of the nano tube resin;

curing the first and second coats of the nano tube resin;

forming a second insulation layer on the cured nano tube resin;

forming a support base portion of pre-preg material on the second insulation portion;

applying at least one vacuum bagging with the tool forming surface portion of pre-preg material on the master mandrel;

forming passages to the selectively placed conductive strips through the support base portion, the second insulation layer and a portion of the cured nano tube resin; and coupling conductive wires to the selectively placed conductive strips through the formed passages.

11. The method of claim 10 wherein at least one of the first and second insulation layers is a dry woven glass layer.

* * * * *

UNITED STATES PATENT AND TRADEMARK OFFICE
CERTIFICATE OF CORRECTION

PATENT NO. : 8,308,889 B2  
APPLICATION NO. : 12/870556  
DATED : November 13, 2012  
INVENTOR(S) : Glancy et al.

Page 1 of 1

It is certified that error appears in the above-identified patent and that said Letters Patent is hereby corrected as shown below:

In the specification:

COLUMN 1, LINES 8-9, Please delete the entire paragraph and insert therefor:

--This invention was made with Government support under contract FA9453-06-D-0368 awarded by the United States Air Force. The Government has certain rights in the invention.--

Signed and Sealed this
Seventeenth Day of February, 2015

Michelle K. Lee
*Deputy Director of the United States Patent and Trademark Office*